(12) United States Patent
Nakashima

(10) Patent No.: US 11,267,059 B2
(45) Date of Patent: Mar. 8, 2022

(54) CONTROL DEVICE OF WIRE ELECTRIC DISCHARGE MACHINE AND MACHINE LEARNING DEVICE

(71) Applicant: FANUC CORPORATION, Yamanashi (JP)

(72) Inventor: Yasuo Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 571 days.

(21) Appl. No.: 15/928,905

(22) Filed: Mar. 22, 2018

(65) Prior Publication Data
US 2018/0281091 A1 Oct. 4, 2018

(30) Foreign Application Priority Data
Mar. 30, 2017 (JP) .............................. JP2017-068520

(51) Int. Cl.
*B23H 1/02* (2006.01)
*G05B 13/02* (2006.01)
(Continued)

(52) U.S. Cl.
CPC ......... *B23H 1/024* (2013.01); *G05B 13/0265* (2013.01); *B23H 7/02* (2013.01);
(Continued)

(58) Field of Classification Search
CPC ........... B23H 1/024; B23H 7/02; B23H 7/16; B23H 7/18–20; G05B 13/04;
(Continued)

(56) References Cited

U.S. PATENT DOCUMENTS

| 5,311,421 A | 5/1994 | Nomura et al. |
| 5,742,018 A * | 4/1998 | Akemura ................. B23H 7/20 |
| | | 219/69.13 |

(Continued)

FOREIGN PATENT DOCUMENTS

| EP | 2327498 A2 | 6/2011 |
| JP | 4734447 B2 | 7/2011 |

(Continued)

OTHER PUBLICATIONS

Webster definition to "observe" (Year: 2020).*

(Continued)

*Primary Examiner* — Phuong T Nguyen
*Assistant Examiner* — Bonita Khlok
(74) *Attorney, Agent, or Firm* — Hauptman Ham, LLP

(57) ABSTRACT

A control device of a wire electric discharge machine and a machine learning device are provided that can appropriately and readily determine a correction parameter. The control device, which optimizes the correction parameter for wire electrical discharge machining process, includes a machine learning device configured to learn the correction parameter for the wire electrical discharge machining process. The machine learning device includes a state observation unit configured to observe, as a state variable, condition data indicative of a condition for the wire electrical discharge machining process, a determination data acquisition unit configured to acquire determination data indicative of the correction parameter of the case where machining precision is favorable in the wire electrical discharge machining process, and a learning unit configured to learn the correction parameter in association with the condition for the wire electrical discharge machining process using the state variable and the determination data.

10 Claims, 7 Drawing Sheets

(51) Int. Cl.
*B23H 7/02* (2006.01)
*B23H 7/20* (2006.01)

(52) U.S. Cl.
CPC ...... *B23H 7/20* (2013.01); *G05B 2219/42018* (2013.01); *G05B 2219/42152* (2013.01); *G05B 2219/45221* (2013.01)

(58) Field of Classification Search
CPC .......... G05B 2219/42018; G05B 2219/42152; G05B 2219/45221; G05B 2219/45043; G05B 19/418; G05B 19/4155; G05B 13/0265–027; G05B 13/0285; G06B 3/08
USPC .......... 219/69.12, 69.1–69.13, 69.15–69.16, 219/69.17, 124.02; 700/162
See application file for complete search history.

(56) References Cited

U.S. PATENT DOCUMENTS

| | | |
|---|---|---|
| 2015/0266122 A1* | 9/2015 | Nakagawa ............... B23H 1/02 700/162 |
| 2017/0014926 A1 | 1/2017 | Kim et al. |
| 2017/0060105 A1 | 3/2017 | Onodera et al. |

FOREIGN PATENT DOCUMENTS

| | | |
|---|---|---|
| JP | 5794401 B1 | 10/2015 |
| JP | 2017-42882 A | 3/2017 |

OTHER PUBLICATIONS

Webster definition to "learn" (Year: 2020).*
Extended European Search Report in EP Application No. 18161329.0, dated Oct. 23, 2018, 9pp.

* cited by examiner $K = K0 + P * K1$

CONTROL DEVICE OF WIRE ELECTRIC DISCHARGE MACHINE AND MACHINE LEARNING DEVICE

RELATED APPLICATIONS

The present application claims priority of Japanese Application Number 2017-068520, filed Mar. 30, 2017, the disclosure of which is hereby incorporated by reference herein in its entirety.

BACKGROUND OF THE INVENTION

1. Field of the Invention

The present invention relates to a control device of a wire electric discharge machine and a machine learning device.

2. Description of the Related Art

A feed rate of a wire electrode needs to be appropriately controlled on a wire electric discharge machine such that a discharge gap between the wire electrode and a workpiece becomes constant. Discharge gap is the distance between a wire electrode and a workpiece during a wire electrical discharge machining process (see FIG. 7). For example, when a wire electrode is simply fed at a constant rate along a wire route, various factors will act thereon, causing changes such as increase and decrease in a discharge gap in the machining process. Such changes in the discharge gap will lead to degradation in the machining precision. For example, when the discharge gap becomes small, short circuiting occurs making it impossible to perform machining. Meanwhile, when the discharge gap becomes large, discharge will not take place, making it difficult to perform the machining. Consequently, a wire electric discharge machine requires control of the feed rate so that the discharge gap is kept constant.

However, it is difficult to directly detect the discharge gap. Accordingly, alternative indicators are often used that is readily detected such as inter-electrode average voltage and discharge delay time. It has been known that the magnitude of inter-electrode average voltage and the length of the discharge delay time both have a correlation to the width of the discharge gap.

In view of this, instead of making the discharge gap constant, various modes of control are performed to ensure the constant nature of these alternative indicators. FIG. 8 is a block diagram that illustrates an example of the discharge feed control based on such alternative indicators. The deviation of the actual detected value with respect to the objective value of an indicator occurs, so as to make the deviation closer to zero, a feed rate command for the wire electrode is modified based on a predetermined control law.

Also, for example, Japanese Patent No. 4734447 and Japanese Patent No. 5794401 describe techniques of ensuring high machining precision by correcting the inter-electrode average voltage in accordance with a machining status.

However, in the control as illustrated in FIG. 8, it is difficult to make the discharge gap constant in all cases. For example, it has been known that the correlation, which is observed in the linear portion, between the inter-electrode average voltage and discharge delay time and the discharge gap collapses at the corner portion under the influences of the facing area between the wire electrode and the workpiece, processing waste concentration, and the like. That is, the detected values such as the inter-electrode average voltage and the discharge delay time are not always universally applicable as the alternative indicators.

Thus, in the actual machining, tuning based on an empirical rule is added to the control based on the detected value of the alternative indicator as illustrated in FIG. 8 to ensure the machining precision. For example, it is known that it is preferable to increase the feed rate for the so-called outer corner relative to that for the linear portion. In view of this, in machining of the outer corner, correction is performed on either of the detected values, objective values, and the control law to increase the feed rate.

For example, in the control illustrated in FIG. 8, the control law is made to carry a correction parameter (for example, gain in proportional control). Also, based on the result of experimentation conducted in advance, a correlation parameter is defined which ensures that the discharge gap becomes constant. In addition, in the machining, the control law is corrected using the correction parameter. Here, the value of the correction parameter depends on many variables, for example, such as programmed shape, wire diameter, workpiece thickness (P1, P2, P3). In addition, the objective values, the detected values, and the control law as such are determined depending on the variables P1, P2, and P3.

In order to carry out control that includes correction processing based on such a conventional empirical rule, it is necessary to conduct extensive/exhaustive experimentation with widely varying the variables that affects the correction parameter to determine the correction parameter. However, as one problem, since there are numerous variables that affect the correction parameter, the man-hours of the experimentation are also enormous and the development takes time. Also, as another problem, it is not possible to respond to machining that uses a variable for which an experiment is not conducted in advance.

SUMMARY OF THE INVENTION

In view of the above, an object of the present invention is to provide a control device of a wire electric discharge machine and a machine learning device that are capable of appropriately and readily determining a correction parameter.

An embodiment of the present invention is a control device that optimizes a correction parameter for performing a wire electrical discharge machining process. The control device includes a machine learning device configured to learn the correction parameter for performing the wire electrical discharge machining process. The machine learning device includes a state observation unit configured to observe, as a state variable, condition data indicative of a condition for performing the wire electrical discharge machining process, a determination data acquisition unit configured to acquire determination data, the determination data being indicative of the correction parameter of a case where machining precision is favorable in the wire electrical discharge machining process, and a learning unit configured to learn, using the state variable and the determination data, the correction parameter in association with the condition for performing the wire electrical discharge machining process.

Another embodiment of the present invention is the control device in which the learning unit includes an error calculation unit configured to calculate an error between a correlation model that derives, from the state variable and the determination data, the correction parameter for performing the wire electrical discharge machining process and a correction feature identified based on teacher data prepared in advance; and a model updating unit configured to update the correlation model such that the error is reduced.

Another embodiment of the present invention is the control device in which the learning unit carries out operation of the state variable and the determination data using a multilayer structure.

Another embodiment of the present invention is the control device which further includes a decision-making unit configured to display or output, based on a learning result by the learning unit, the correction parameter for performing the wire electrical discharge machining process.

Another embodiment of the present invention is the control device in which the learning unit learns, using the state variables and pieces of the determination data obtained for each of a plurality of the wire electric discharge machines, the correction parameter for performing the wire electrical discharge machining process on each of the wire electric discharge machines.

Another aspect of the present invention is a machine learning device in a control device optimizing a correction parameter for performing a wire electrical discharge machining process. The machine learning device includes a state observation unit configured to observe, as a state variable, condition data indicative of a condition for performing the wire electrical discharge machining process, a determination data acquisition unit configured to acquire determination data, the determination data being indicative of the correction parameter of a case where machining precision is favorable in the wire electrical discharge machining process, and a learning unit configured to learn, using the state variable and the determination data, the correction parameter in association with the condition for performing the wire electrical discharge machining process.

According to the present invention, it is made possible to provide a control device of a wire electric discharge machine and a machine learning device that can appropriately and readily determine a correction parameter.

BRIEF DESCRIPTION OF THE DRAWINGS

The foregoing and other objects and features of the present invention will be apparent from the illustration of the following embodiments with reference to the accompanying drawings, in which.

DETAILED DESCRIPTION OF THE PREFERRED EMBODIMENTS

The embodiments of the present invention will be described hereinbelow with reference to the drawings.

Figure 1:
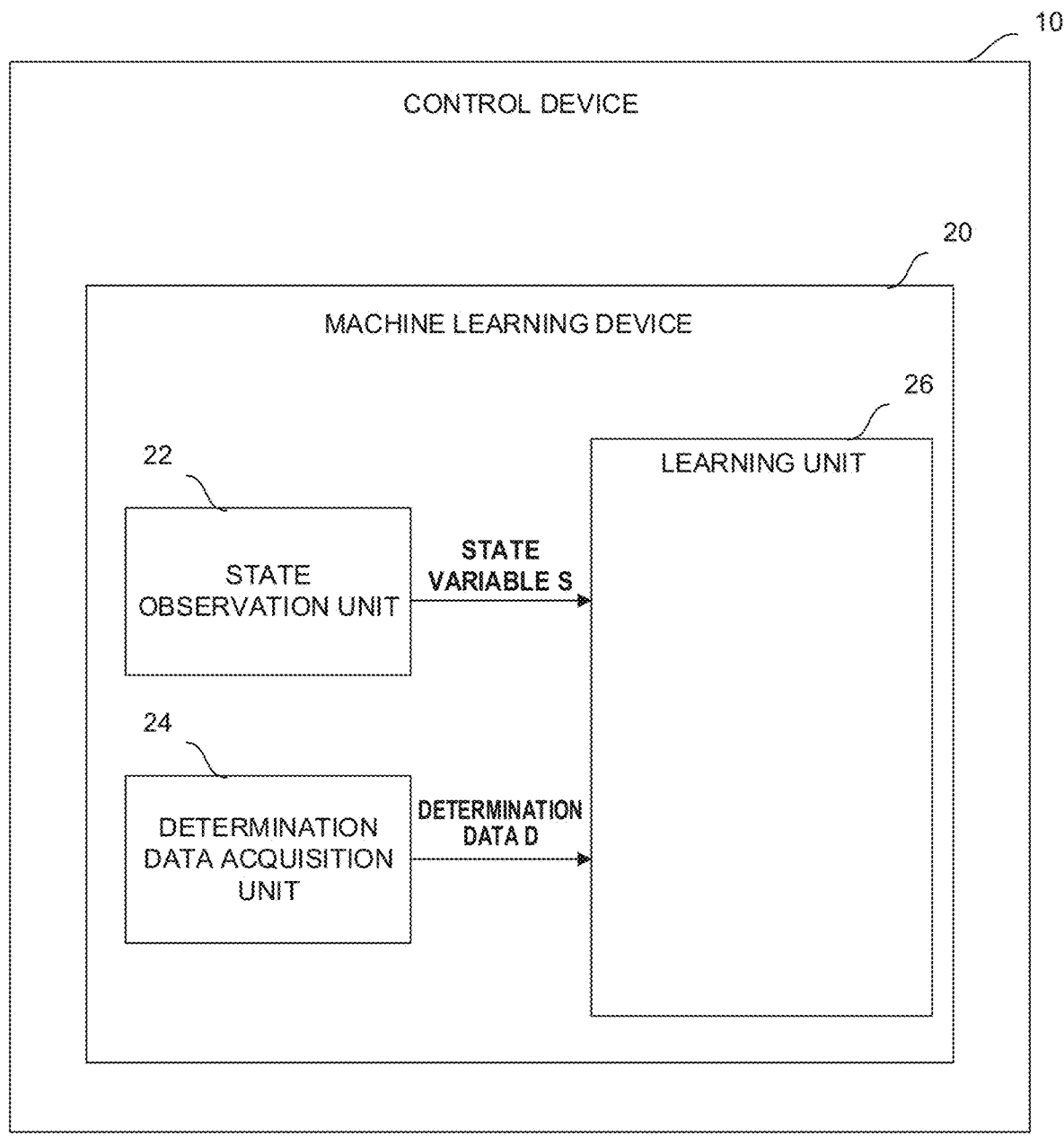
FIG. 1 is a block diagram illustrating an example configuration of a control device.

FIG. 1 is a schematic functional block diagram of a control device (hereafter simply referred to as "control device") 10 of a wire electric discharge machine in accordance with a first embodiment. The control device 10 can be implemented, for example, as a numerical control device that controls a wire electric discharge machine (not shown). The control device 10 includes a machine learning device 20 which includes software (learning algorithm, etc.) and hardware (a CPU, etc. of a computer) for autonomously learning a correction parameter of an optimal control law through so-called machine learning to perform feed rate control in a wire electrical discharge machining process, in other words, control of an indicator such as inter-electrode average voltage and discharge delay time. The control device 10 provided in the machine learning device 20 forms, through the learning, a model structure that represents correlation between various variables (typically programmed shape, wire diameter, workpiece thickness, etc.) for performing the wire electrical discharge machining process and the correction parameter in the wire electrical discharge machining process.

As illustrated in FIG. 1 by way of functional blocks, the machine learning device 20 provided in the control device 10 includes a state observation unit 22 configured to observe, as a state variable S, condition data indicative of various conditions for performing the wire electrical discharge machining process, a determination data acquisition unit 24 configured to acquire determination data D indicative of the correction parameter in the case where a machining state is favorable, and a learning unit 26 configured to carry out learning using the state variable S and the determination data D.

The state observation unit 22 can be configured, for example, as a function of the CPU of the computer. Alternatively, the state observation unit 22 can be configured, for example, as software for enabling the CPU of the computer to function. The state variable S observed by the state observation unit 22 can include, for example, a machining shape (for example, concavity/convexity of a corner section, so-called sharp corner or arc, an angle in the case of the sharp corner, a curvature in the case of the arc, etc.) defined by a machining program, machining specifications (wire diameter, workpiece thickness, nozzle clearance, etc.). It should be noted that the present invention does not intend to delimit the variables to these ones and can also adopt any other appropriate variable as the state variable S.

The determination data acquisition unit 24 can be configured, for example, as a function of the CPU of the computer. Alternatively, the determination data acquisition unit 24 can be configured, for example, as software for enabling the CPU of the computer to function. The determination data D acquired by the determination data acquisition unit 24 is the correction parameter, at the time of machining, of the case where, after the wire electrical discharge machining process has been done, an actual machining precision of the workpiece is measured, it is determined whether or not the desired machining precision has been achieved, and it is determined that the desired machining precision is actually achieved. The inspection and determination of the machining precision can be realized, for example, by a measuring machine capable of inspecting unevenness of the workpiece surface, where the measuring machine determines whether or not the workpiece that has been machined satisfies a predetermined condition. Also, the machining precision can also be determined by a user inspecting the workpiece that has been machined using a microscope or the like. The determination data D is a correction parameter of the case where the wire electrical discharge machining process is carried out with the state variable S and the machining state is favorable, where the determination data D indirectly represents one state of a favorable environment for performing the wire electrical discharge machining process.

In this manner, the machining of a workpiece with the state variable S, the determination of the machining state, and outputting of the determination data D by the wire electric discharge machine are repeatedly carried out in the environment while the machine learning device 20 provided in the control device 10 proceeds with the learning.

The learning unit 26 can be configured, for example, as one function of the CPU of the computer. Alternatively, the learning unit 26 can be configured, for example, as software for enabling the CPU of the computer to function. The learning unit 26 learns the relationship between the state variable S and the determination data D in the wire electrical discharge machining process in accordance with any learning algorithm generically called machine learning. In one cycle of the learning, one set of a certain state variable S and determination data D of the case where the machining is done with the state variable S is input to the learning unit 26. The learning unit 26 repeatedly carries out the learning cycle of this kind. For example, the machining is performed with various machining shapes, wire diameters, workpiece thicknesses, and the like, and the state variable S and the determination data D at that time are input. Also, state variables S and pieces of the determination data D that have been collected from multiple wire electric discharge machines of the same type may be input to one single learning unit 26. For example, it is also possible to generate so-called big data through online collection of machining data including the set of the state variable S and the determination data D from numerous sites where the wire electric discharge machines are installed.

By repeating the learning cycle of this kind, the learning unit 26 can automatically identify a feature that implies the correlation between the state variable S and the determination data D in the case where the result of the electrical discharge machining is favorable. At the beginning of the learning algorithm, the correlation model between the state variable S and the determination data D is unknown, and the learning unit 26 interprets the correlation by identifying the feature gradually as the learning proceeds. When the correlation between the state variable S and the determination data D is interpreted to a certain reliable level, the learning results that are repeatedly output by the learning unit 26 is allowed to be used to carry out selection of an action (that is, decision making) of what kind of correction parameter should be used in the electrical discharge machining process in the current state (that is, a machining shape, machining specifications, etc.). That is, the learning unit 26, in response to the progress of the learning algorithm, can allow the correlation between the action regarding the correction parameter to be used and the current state to get gradually closer to the optimum solution.

According to the machine learning device 20 provided on the control device 10, it is made possible, by using the learning results of the learning unit 26, to obtain the optimal correction parameter in accordance with the machining shape, the machining specifications, and the like automatically and accurately without relying on experiences, complicated correspondence tables, or the like. When the optimal correction parameter in accordance with the machining shape, the machining specifications, and the like are allowed to be automatically obtained without relying on experiences or the like, the correction parameter to be applied to the control law can be quickly determined just by carrying out the analysis on the machining program before starting the wire electrical discharge machining process (which is a known technique and not explained in detail herein) and entering specification data including a wire diameter, a workpiece thickness, etc. Accordingly, it is made possible to shorten the time associated with setting of the correction parameter and even the entire wire electrical discharge machining process.

Figure 2:
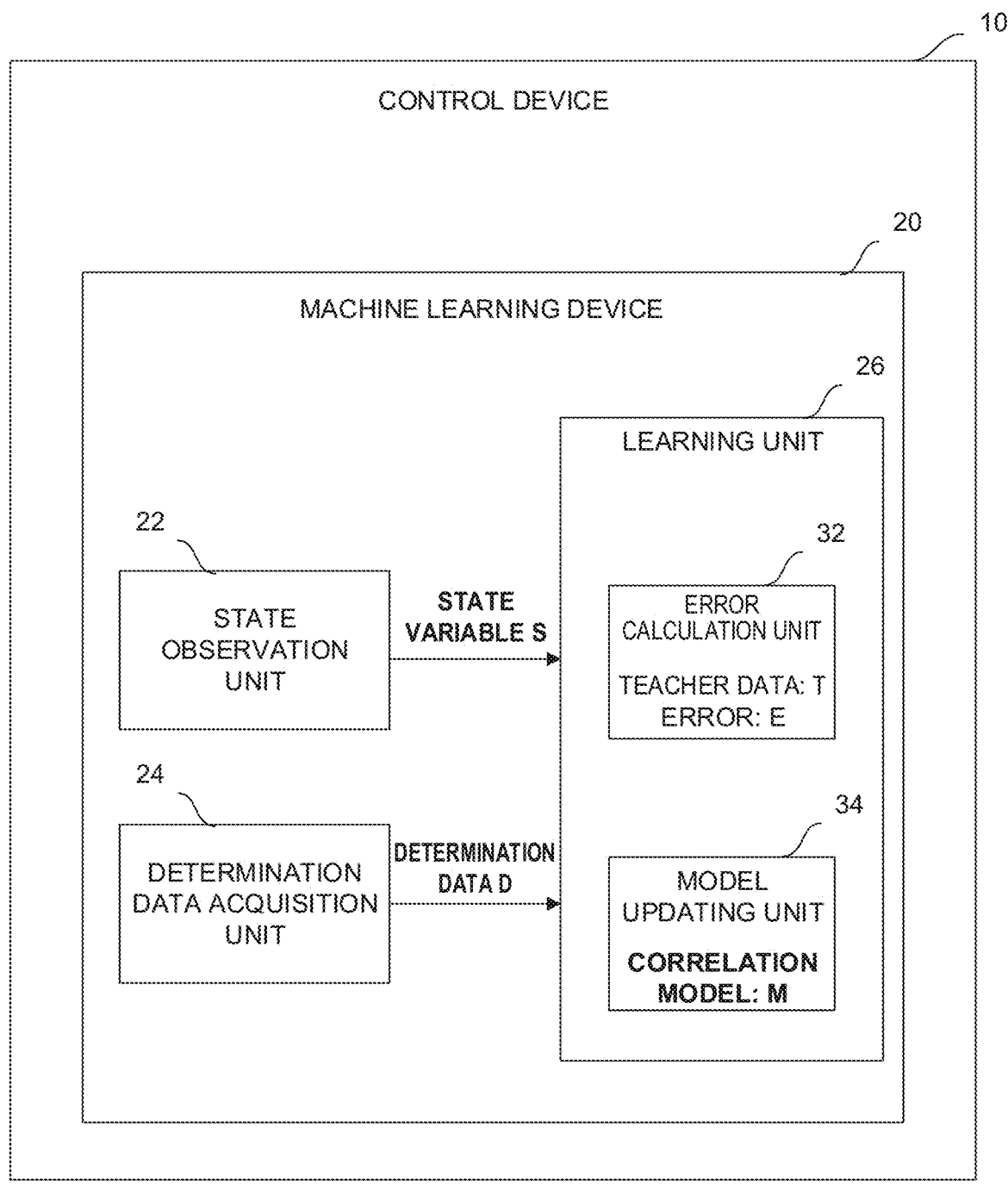
FIG. 2 is a block diagram illustrating an example configuration of the control device including a learning unit that carries out supervised learning.

In the machine learning device 20 having the above-described configuration, the learning algorithm executed by the learning unit 26 is not limited to a particular one, and known learning algorithms can be adopted as the machine learning. FIG. 2 illustrates a configuration which includes the learning unit 26 that carries out supervised learning as one example of the learning algorithms. The supervised learning is a scheme where known data sets (which is referred to as teacher data) of an input and an output corresponding thereto are given in large quantities in advance, and the feature that implies the correlation between the input and the output is identified based on these pieces of teacher data, and thereby the correlation model for estimating the desired output in response to a new input (in the machine learning device 20 according to this embodiment, the correction parameter in a case where the wire electrical discharge machining process is performed under a certain condition) is learned.

In the machine learning device 20 provided in the control device 10 illustrated in FIG. 2, the learning unit 26 includes an error calculation unit 32 configured to calculate an error E between a correlation model M that derives, from the state variable S and the determination data D, an optimal correction parameter for performing the wire electrical discharge machining process, and a correlation feature identified from previously prepared teacher data T, and a model updating unit 34 configured to update the correlation model M such that the error E is reduced. The learning unit 26 learns the optimal correction parameter under a given machining condition by the model updating unit 34 repeating updating of the correlation model M.

An initial value of the correlation model M represents, in a simplified manner, for example, the correlation between the state variable S and the determination data D (for example, by any appropriate function), and is given to the learning unit 26 before starting the supervised learning. The teacher data T can be configured, for example, by an empirical value (a known data set of a machining shape and machining specifications and appropriate correction parameter) accumulated by recording various conditions determined by skilled operators in the past wire electrical discharge machining processes, and is given to the learning unit 26 before starting the supervised learning. The error calculation unit 32 identifies, from large quantities of teacher data T given to the learning unit 26, a correlation feature that implies the correlation between the machining shape and the machining specifications and the appropriate correction parameter, and obtains the error E between this correlation feature and the correlation model M corresponding to the state variable S and the determination data D in the current state. The model updating unit 34 updates the correlation model M, for example, in accordance with a predefined update rule in the direction that reduces the error E.

In the next learning cycle, the error calculation unit 32, using the state variable S and the determination data D that have changed as a result of attempting the implementation process in accordance with the correlation model M that has been updated, obtains the error E for the correlation model M corresponding to these state variable S and determination data D that have changed, and the model updating unit 34 again updates the correlation model M. In this manner, the correlation between the current state (machining shape and machining specifications) of the environment that has been unknown and an action in response thereto (decision of an appropriate correction parameter) is gradually revealed. That is, by updating of the correlation model M, the relationship between the machining shape and the machining specifications and the appropriate correction parameter for performing the wire electrical discharge machining process with the machining shape and the machining specifications is gradually made closer to the optimum solution.

Figure 3A:
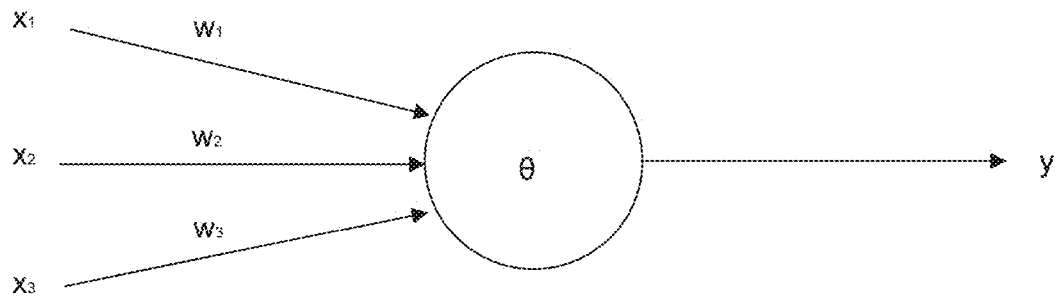
FIG. 3A is a schematic diagram illustrating a neuron model in supervised learning.
Figure 3B:
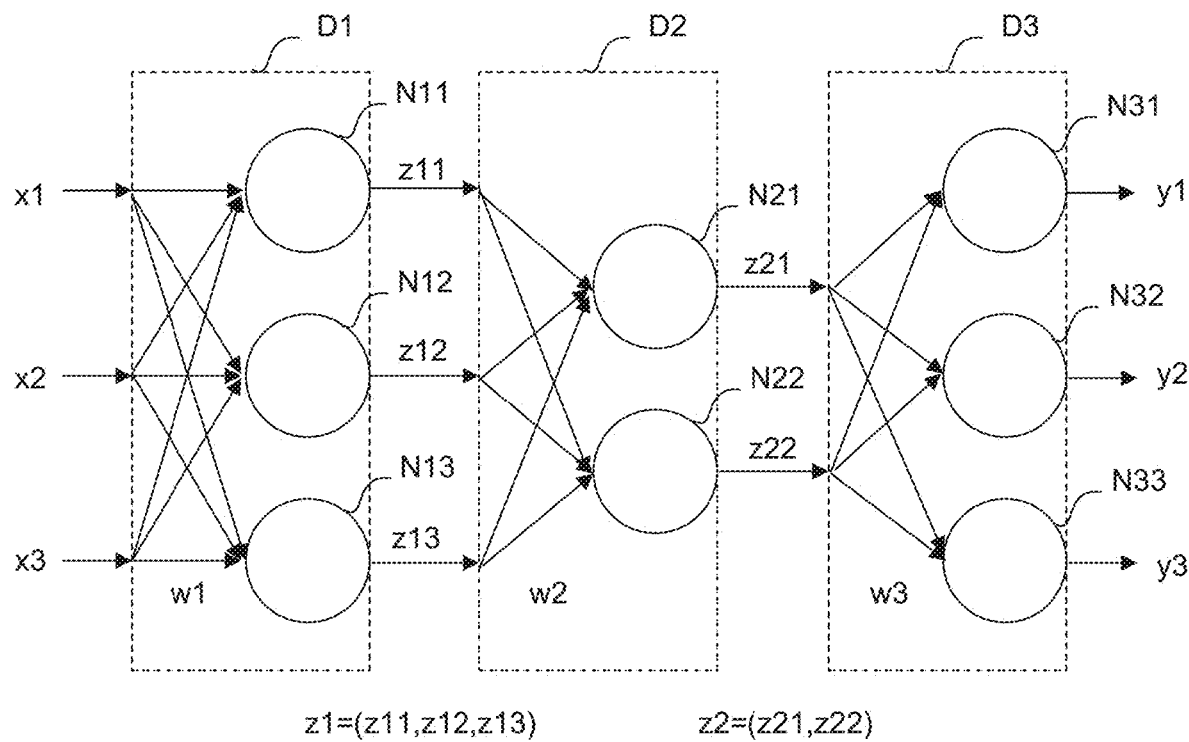
FIG. 3B is a schematic diagram illustrating a model of a neural network.

When making the supervised learning proceed, for example, a neural network can also be used. FIG. 3A schematically illustrates a neuron model. FIG. 3B schematically illustrates a model of a three-layer neural network configured by combining the neurons illustrated in FIG. 3A. The neural network can be configured, for example, by a computing device and a storage device, etc. imitating the neuron model.

The neuron illustrated in FIG. 3A is adapted to output a result y for multiple inputs x (here, as one example, input $x_1$ to input $x_3$). Each of the inputs $x_1$ to $x_3$ are multiplied by a weight w ($w_1$ to $w_3$) corresponding to this input x. As a result, the neuron outputs an output y represented by the following expression 1. It should be noted that in the expression 1, the inputs x, the output y, and the weights w are all vectors. Also, θ is a bias, and $f_k$ is an activation function.

$$y = f_k(\Sigma_{i=1}^n x_i w_i - \theta) \quad \text{(Expression 1)}$$

Multiple inputs x (here, as an example, input x1 to input x3) are input to the three-layer neural network illustrated in FIG. 3B from the left side and results y (here, as an example, result y1 to result y3) are output on the right side. In the example shown in the figure, each of the inputs x1, x2, and x3 are multiplied by a corresponding weight (generically represented by w1) and the individual inputs x1, x2, and x3 are all input to the three neurons N11, N12, and N13.

In FIG. 3B, the outputs of each of the neurons N11 to N13 are generically represented by z1. A z1 can be regarded as a feature vector extracting a feature amount of an incoming vector. In the example shown in the figure, each of the feature vector z1 is multiplied by a corresponding weight (generically represented by w2), and the individual feature vectors z1 are each input to two neurons N21 and N22. The feature vector z1 represents the feature between the weight w1 and the weight w2.

In FIG. 3B, the respective outputs of the neurons N21 to N22 are generically represented by z2. A z2 can be regarded as a feature vector extracting the feature amount of the feature vector z1. In the example shown in the figure, each of the feature vectors z2 are multiplied by the corresponding weight (generically represented by w3), and the individual feature vectors z2 are all input to the three neurons N31, N32, and N33. The feature vector z2 represents the feature between the weight w2 and the weight w3. Finally, the neurons N31 to N33 output the results y1 to y3, respectively.

In the machine learning device 20 provided in the control device 10, the state variable S and the determination data D are used as the input x and the learning unit 26 carries out multi-layer structured operation in accordance with the above-described neural network, and thus the optimal correction parameter (result y) for performing the wire electrical discharge machining process can be output. It should be noted that the operating modes of the neural network includes a learning mode and a value prediction mode, and, for example, a weight W is learned using a learning data set in the learning mode, and value judgment on the action can be performed in the value prediction mode using the learned weight W. It should be noted that, in the value prediction mode, it is also possible to perform detection, classification, inference, etc.

The configuration of the above-described control device 10 can be described as a machine learning method (or software) that the CPU of the computer executes. This machine learning method is a machine learning method for learning the optimal correction parameter for performing the wire electrical discharge machining process, and includes the step of observing, by the CPU of the computer, the condition data indicative of the various conditions for performing the wire electrical discharge machining process as the state variable S, the step of acquiring the determination data D indicative of the correction parameter in the case where the state of the workpiece when the machining is performed with the state variable S is favorable, and the step of learning the various conditions at the time of performing electrical discharge machining and the appropriate correction parameter in association with each other using the state variable S and the determination data D.

Figure 9:
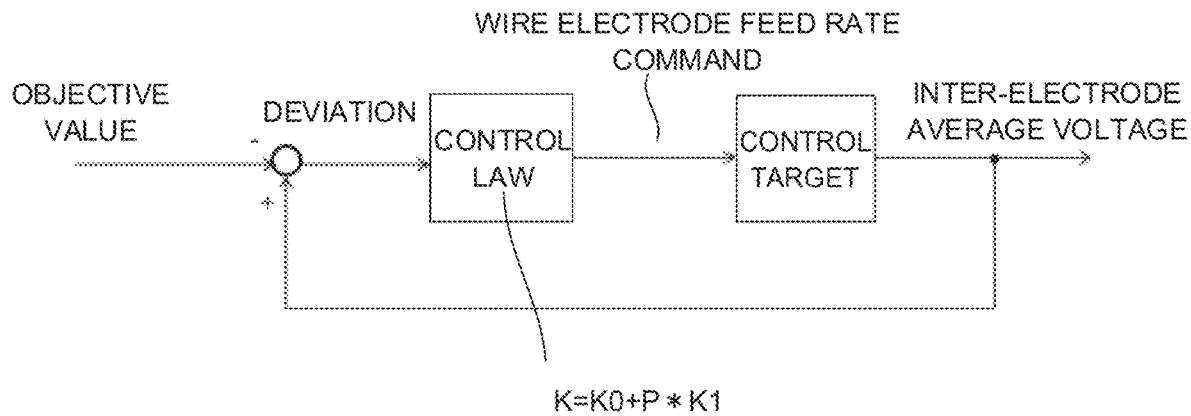
FIG. 9 is a block diagram illustrating an example of discharge feed control in a wire electric discharge machine that uses a control device.

The appropriate correction parameter, which has been learned in this manner by the control device 10, for performing the wire electrical discharge machining process can be used, for example, in the following manner when performing the wire electrical discharge machining process. FIG. 9 is a functional block diagram of the control device of the wire electric discharge machine that uses the learning result of the control device 10. The control device of the wire electric discharge machine carries out the discharge feed control, for example, using proportional law as the control law and the inter-electrode average voltage as the detected value.

The control device of the wire electric discharge machine changes the control law while machining the linear portion and while machining the corner portion. Specifically, the proportional gain is changed by giving the value of the proportional gain as K=K0+P×K1 and changing the parameter P. That is, the parameter P is the sensitivity to the change in the proportional gain. The control device of the wire electric discharge machine carries out the machining of the linear portion with K=K0. Here, K0 can be determined as appropriate using various prior art techniques. Meanwhile, machining of the corner portion is performed with K=K0+ P×K1. Here, the control device of the wire electric discharge machine inputs, as the state variable S, the various conditions of the electrical discharge machining which is currently to be performed to the control device 10, and thereby obtains the determination data D corresponding to the state variable S, i.e., the correction parameter. In addition, by using this correction parameter as P, the optimal gain can be obtained. By virtue of this, the control device of the wire electric discharge machine which uses the control device 10 is allowed to increase shape accuracy of the corner portion.

Figure 4:
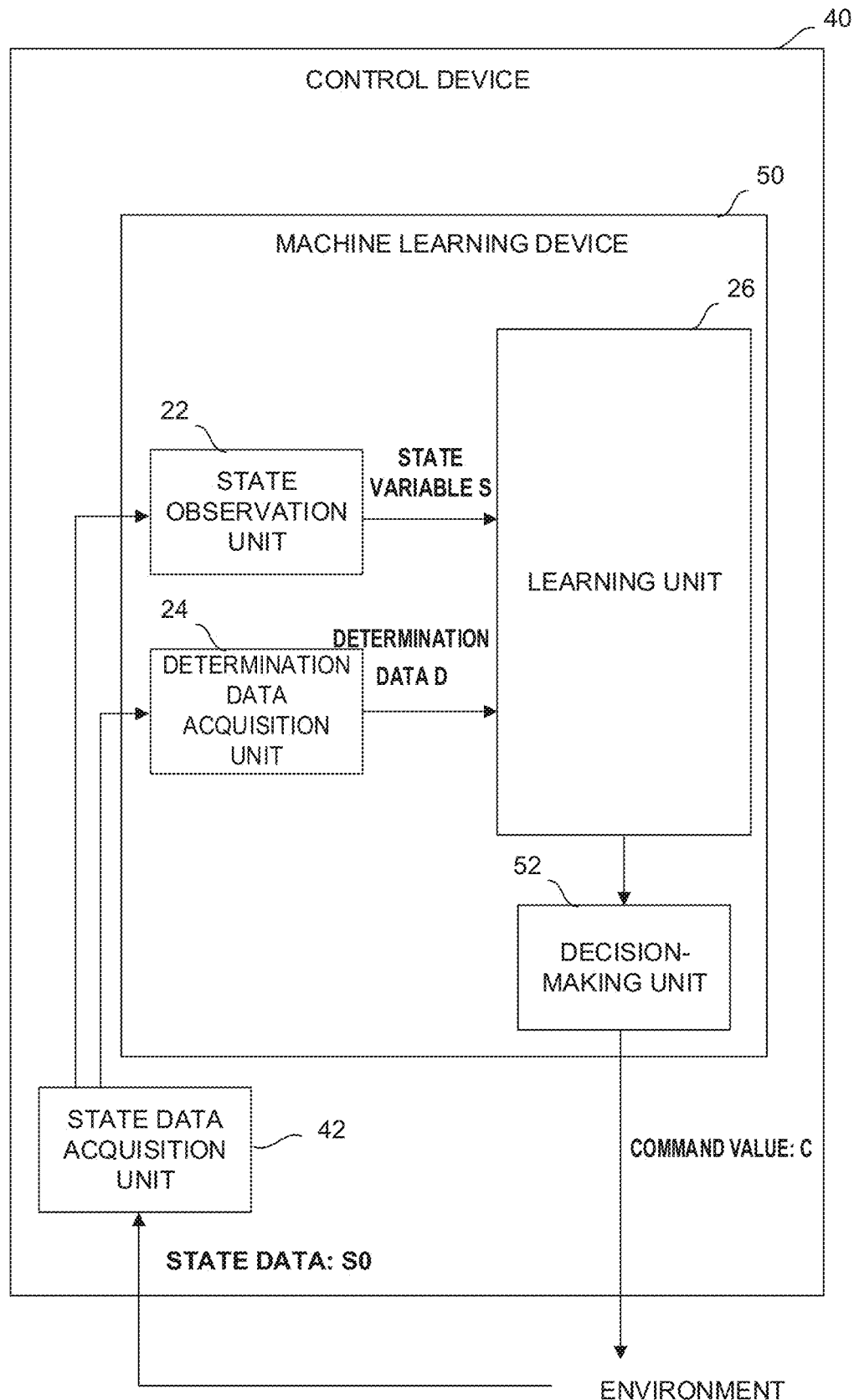
FIG. 4 is a block diagram illustrating another example configuration of the control device.

FIG. 4 illustrates the control device 40 in accordance with a second embodiment. The control device 40 includes a machine learning device 50, and a state data acquisition unit 42 configured to obtain the state variable S observed by the state observation unit 22 as the state data S0.

The machine learning device 50 provided in the control device 40 includes, in addition to software (learning algorithm, etc.) and hardware (the CPU of the computer, etc.) for autonomously learning the optimal correction parameter for performing the wire electrical discharge machining process by machine learning, software (arithmetic algorithm, etc.) for outputting the and hardware (the CPU of the computer, etc.) for displaying the optimal correction parameter for performing the wire electrical discharge machining process that has been learned or outputting it as the command for the wire electric discharge machine (not shown). The machine learning device 50 provided in the control device 40 can have a configuration in which one common CPU executes all the software such as learning algorithm, arithmetic algorithm, etc.

The decision-making unit 52 can be configured, for example, as one function of the CPU of the computer. Alternatively, the decision-making unit 52 can be configured, for example, as software for enabling the CPU of the computer to function. The decision-making unit 52 displays the optimal correction parameter for performing the wire electrical discharge machining process learned by the learning unit 26 for an operator, or generates and outputs the command value C for the wire electric discharge machine based on the optimal correction parameter for performing the wire electrical discharge machining process that has been learned by the learning unit 26. When the decision-making unit 52 displays the optimal correction parameter for performing the wire electrical discharge machining process and setting of the correction parameter by the operator based on the display is performed, or when the decision-making unit 52 has output the command value C for the wire electric discharge machine, the state of the environment changes according to it.

The machine learning device 50 can gradually increase the reliability of the optimal correction parameter for performing the wire electrical discharge machining process determined on its own account by repeating the learning cycle. When the machining state of the workpiece machined using the correction parameter displayed or output to the environment by the decision-making unit 52 is favorable, then the determination data acquisition unit 24 acquires the correction parameter as the determination data D in the next learning cycle. Simultaneously, the state observation unit 22 acquires the state variable S at the time of the machining. The learning unit 26 continues the learning using the state variable S and the determination data D that have been input, for example, by updating the correlation model M.

The machine learning device 50 provided in the control device 40 having the above-described features exhibits the same effect as that of the above-mentioned machine learning device 20. In particular, the machine learning device 50 can change the state of the environment by the output of the decision-making unit 52. Meanwhile, in the machine learning device 20, a function corresponding to the decision-making unit for reflecting the learning result of the learning unit 26 in the environment can be provided from an external device (for example, the control device of the wire electric discharge machine).

Figure 5:
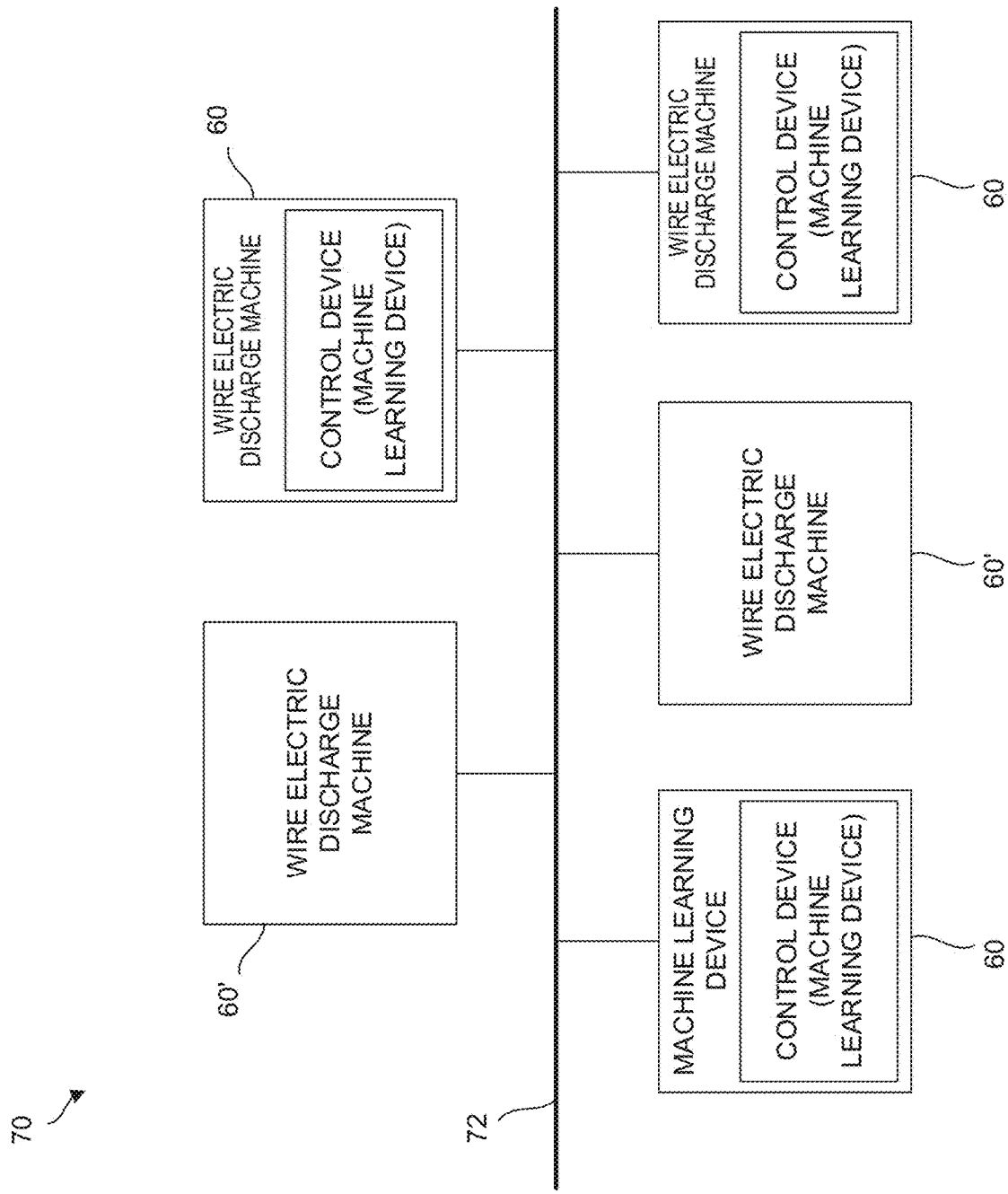
FIG. 5 is a block diagram illustrating an example configuration of a control system.

FIG. 5 illustrates a control system 70 in accordance with an embodiment including the wire electric discharge machine 60. The control system 70 includes multiple wire electric discharge machines 60, 60' having the same mechanical configuration and a network 72 connecting these wire electric discharge machines 60, 60' to each other, and at least one of the multiple wire electric discharge machines 60, 60' is configured as a wire electric discharge machine 60 that includes the above-described control device 40. Also, the control system 70 can include a wire electric discharge machine 60' that does not include the control device 40. The wire electric discharge machines 60, 60' have the general configuration needed to carry out the wire electrical discharge machining process.

The control system 70 having the above-described features can obtain automatically and accurately, without depending on experiences, the correction parameter suitable for the machining shape and the machining specification by the wire electric discharge machine 60 that includes the control device 40 of the multiple wire electric discharge machines 60, 60' using the learning result of the learning unit 26. Also, the control device 40 of the at least one wire electric discharge machine 60 can be configured such that, based on the state variable S and the determination data D that have been obtained for each of the other multiple wire electric discharge machine 60, 60,' it learns the appropriate correction parameter for performing the wire electrical discharge machining process commonly applicable to all the wire electric discharge machines 60, 60' and the learning result is shared by all the wire electric discharge machines 60, 60'. Thus, according to the control system 70, with more diverse data set (including the state variable S and the determination data D) used as the input, it is made possible to increase the speed and reliability of the learning of the appropriate correction parameter for performing the wire electrical discharge machining process.

Figure 6:
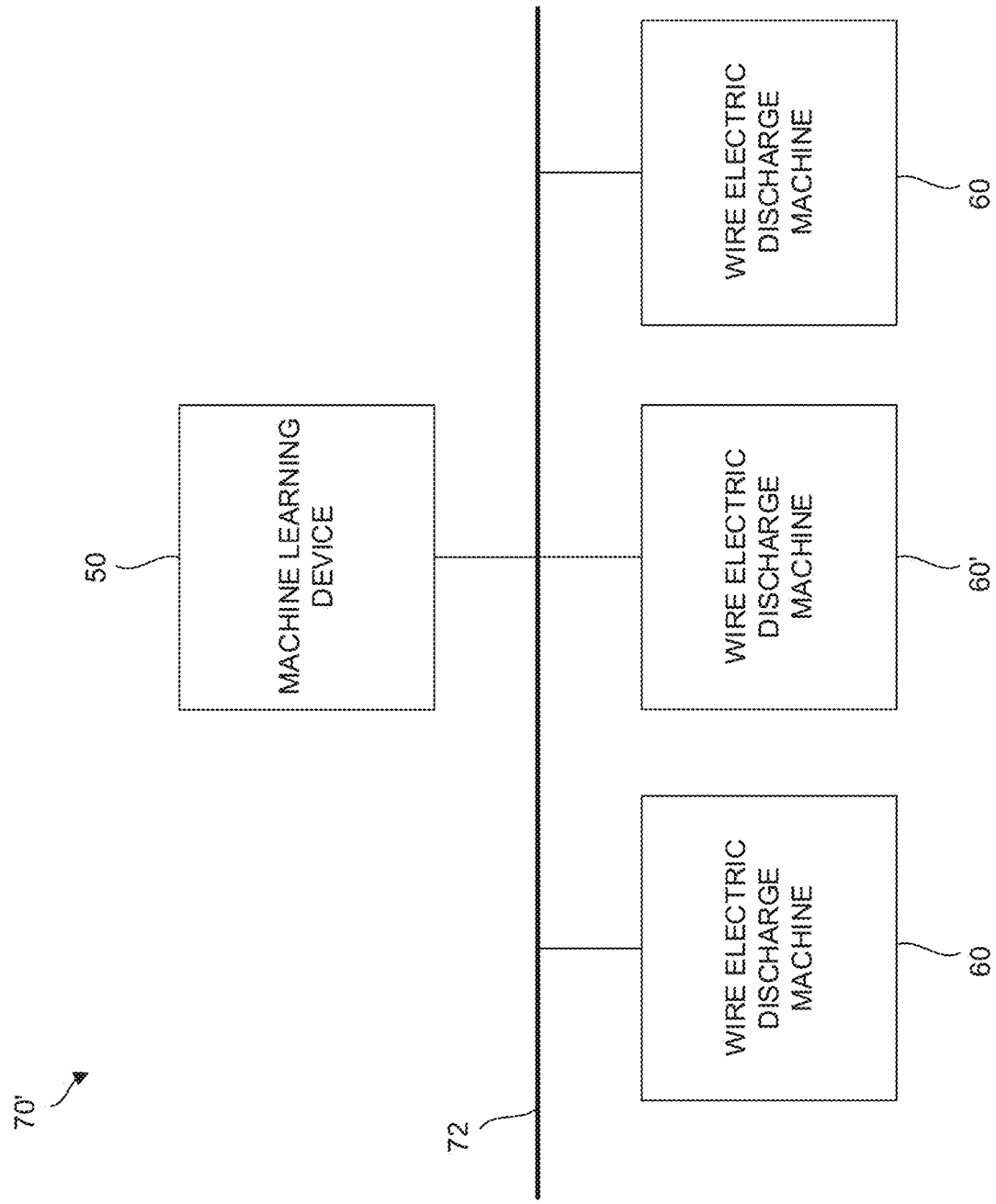
FIG. 6 is a block diagram illustrating another example configuration of the control system.
Figure 7:
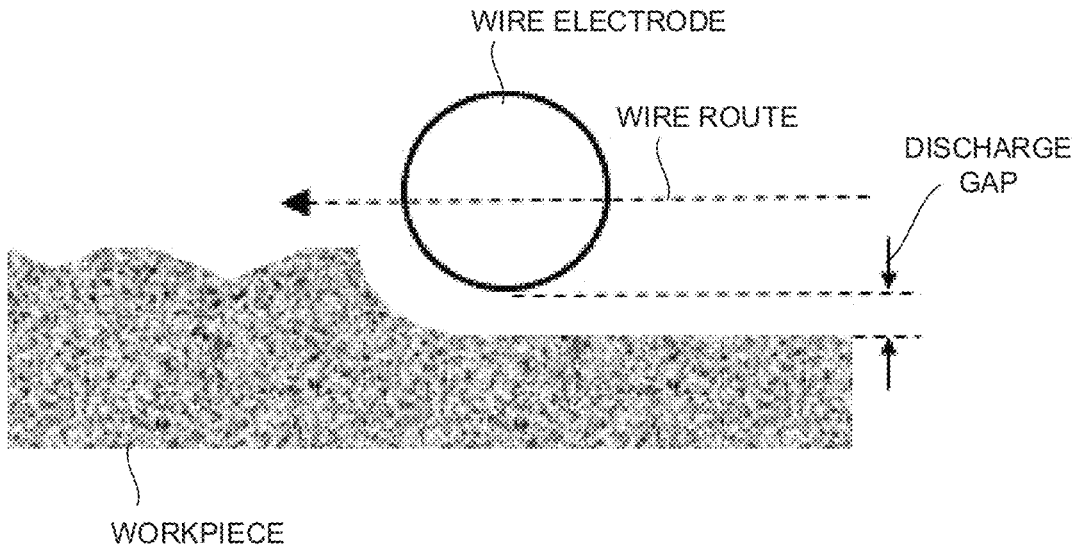
FIG. 7 is a schematic diagram illustrating discharge feed control in a wire electric discharge machine.
Figure 8:
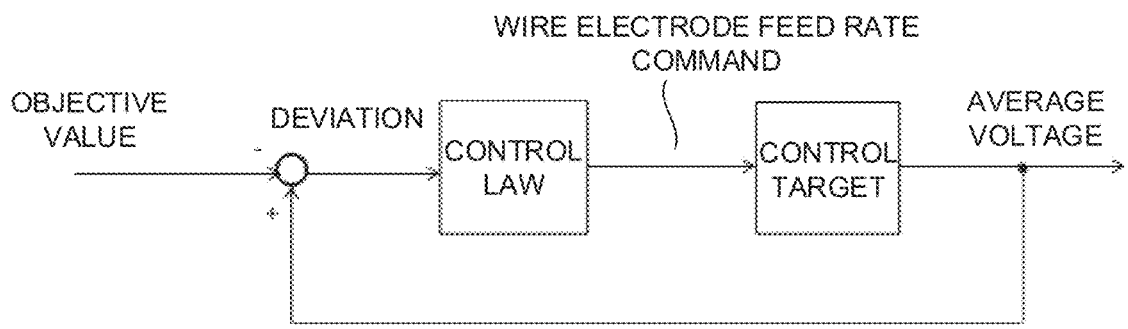
FIG. 8 is a block diagram illustrating an example of discharge feed control in a wire electric discharge machine.

FIG. 6 illustrates the control system 70' in accordance with another embodiment including the wire electric discharge machine 60'. The control system 70' includes a machine learning device 50 (or 20), multiple wire electric discharge machines 60' having the same mechanical configuration, and a network 72 connecting the wire electric discharge machines 60' and the machine learning device 50 (or 20) to each other.

The control system 70' having the above-described features can obtain automatically and accurately, without depending on experiences, the correction parameter suitable for the machining shape and the machining specifications by the machine learning device 50 (or 20) learning the appropriate correction parameter for performing the wire electrical discharge machining process commonly applicable to all the wire electric discharge machine 60' based on the state variable S and the determination data D that have been obtained for each of the multiple wire electric discharge machines 60' and using the learning result.

The control system 70' can have a configuration in which the machine learning device 50 (or 20) resides in a cloud server prepared in the network 72. According to this configuration, regardless of the place where and the time when each of the multiple wire electric discharge machine 60' exists, a necessary number of wire electric discharge machine 60' when needed can be connected to the machine learning device 50 (or 20).

An operator operating the control system 70, 70' can carry out the determination at an appropriate time after having started the learning by the machine learning device 50 (or 20), of whether or not the achievement level of the learning (i.e., the reliability of the appropriate correction parameter for performing the wire electrical discharge machining process) by the machine learning device 50 (or 20) of appropriate correction parameter for performing the wire electrical discharge machining process has reached the required level.

While the embodiments of the present invention have been described above, the present invention is not limited to the above-described embodiments and can be worked in various modes with modifications made as appropriate.

For example, the learning algorithm executed by the machine learning devices 20, 50 and the arithmetic algorithm executed by the machine learning device 50, and the control algorithm executed by the control devices 10, 40, and the like are not limited to those described above and various algorithms can be adopted.

Also, in the above-described embodiments, the condition data indicative of the various conditions for performing the wire electrical discharge machining process are defined as the state variable S and the correction parameter in the case where the machining state is favorable is defined as the determination data D. However, the present invention can be achieved by defining, for example, the condition data indicative of the various conditions for performing the wire electrical discharge machining process as S1, and the correction parameter as S2, and the set of S1 and S2 as the state variable S, and defining the data indicative of the machining result with the state variable indicative of whether the machining result is favorable or unfavorable as the determination data D. In this case, for example, when S1 and any appropriate S2 are input to the learned machine learning device, by identifying the model in which the machining result becomes favorable, it is possible to identify the appropriate correction parameter for performing the wire electrical discharge machining process.

What is claimed is:

1. A controller for optimizing a proportional gain for performing a wire electrical discharge machining process in a wire electrical discharge machine, the controller comprising a processor configured to
    learn the proportional gain for performing the wire electrical discharge machining process,
    observe, as a state variable, condition data indicative of a condition for performing the wire electrical discharge machining process, the condition data including at least a machining shape defined by a machining program;
    acquire determination data, the determination data being indicative of the proportional gain of a case where machining precision is favorable in the wire electrical discharge machining process; and
    carry out supervised learning, using the state variable and the determination data, to associate the proportional gain with the condition for performing the wire electrical discharge machining process,
    wherein the machining shape includes a section of a workpiece to be machined with a gap between the workpiece and a wire electrode of the wire electrical discharge machine, and
    wherein an unevenness, which is undefined by the machining program, is on a surface of the section of the workpiece and the unevenness causes changes in the gap in the wire electrical discharge machining process defined by the machining program.

2. The controller according to claim 1, wherein the processor is further configured to:
    calculate an error between a correlation model that derives, from the state variable and the determination data, the proportional gain for performing the wire electrical discharge machining process and a correlation feature identified based on teacher data prepared in advance; and
    update the correlation model such that the error is reduced.

3. The controller according to claim 1, wherein the processor is further configured to carry out operation of the state variable and the determination data using a multilayer structure.

4. The controller according to claim 1, wherein the processor is further configured to learn, using the state variables and pieces of the determination data obtained for each of a plurality of wire electric discharge machines, the proportional gain for performing the wire electrical discharge machining process on each of the wire electric discharge machines.

5. The controller according to claim 1, wherein the machining shape is programmed in the machining program.

6. The controller according to claim 1, wherein the machining shape includes at least one of concavity, convexity, an angle or a curvature, of a corner section of the workpiece to be machined.

7. The controller according to claim 1, wherein the proportional gain is for controlling a feed rate of the wire electrode in the wire electrical discharge machining process.

8. The controller according to claim 1, wherein a first value of the proportional gain at a corner portion of the machining shape defined by the machining program is different from a second value of the proportional gain at a linear portion of the machining shape defined by the machining program.

9. The controller according to claim 1, wherein the processor is configured to carry out the supervised learning to learn a correction parameter sensitive to a change of the proportional gain.

10. The controller according to claim 9, wherein the learned correction parameter is applicable to determine a first value of the proportional gain at a corner portion of the machining shape defined by the machining program, so that the first value is different from a second value of the proportional gain at a linear portion of the machining shape defined by the machining program.

* * * * *